US008793784B2

(12) United States Patent
Métivier et al.

(10) Patent No.: US 8,793,784 B2
(45) Date of Patent: Jul. 29, 2014

(54) SECURE METHOD FOR CONTROLLING THE OPENING OF LOCK DEVICES BY MEANS OF A COMMUNICATING OBJECT SUCH AS A MOBILE PHONE

(75) Inventors: Pascal Métivier, Feucherolles (FR); Aitor Agueda, Hendaye (FR)

(73) Assignee: Openways SAS, Feucherolles (FR)

( * ) Notice: Subject to any disclaimer, the term of this patent is extended or adjusted under 35 U.S.C. 154(b) by 0 days.

(21) Appl. No.: 13/412,643

(22) Filed: Mar. 6, 2012

(65) Prior Publication Data

US 2012/0233687 A1 Sep. 13, 2012

(30) Foreign Application Priority Data

Mar. 8, 2011 (EP) .................................... 11157388

(51) Int. Cl.
*G06F 7/04* (2006.01)
*G07C 9/00* (2006.01)

(52) U.S. Cl.
CPC ................................ *G07C 9/00904* (2013.01); *G07C 9/00103* (2013.01)
USPC ................................ 726/16; 340/5.2; 340/5.7

(58) Field of Classification Search
CPC ......... G06F 21/31; G06F 21/53; G06F 51/83; G06F 51/6218; G06F 2221/2105; G07C 9/00103; G07C 9/00904; H04W 12/06; H04W 12/08
See application file for complete search history.

(56) References Cited

U.S. PATENT DOCUMENTS

| | | | | |
|---|---|---|---|---|
| 5,351,293 | A * | 9/1994 | Michener et al. | 713/171 |
| 5,363,448 | A * | 11/1994 | Koopman et al. | 713/170 |
| 5,612,683 | A | 3/1997 | Trempala et al. | |
| 5,878,330 | A * | 3/1999 | Naumann | 455/71 |
| 6,088,450 | A * | 7/2000 | Davis et al. | 713/182 |
| 6,882,268 | B2 * | 4/2005 | Roz et al. | 340/5.61 |
| 6,885,738 | B2 * | 4/2005 | White et al. | 379/102.06 |
| 7,012,503 | B2 * | 3/2006 | Nielsen | 340/5.6 |
| 7,315,823 | B2 * | 1/2008 | Brondrup | 705/5 |

(Continued)

FOREIGN PATENT DOCUMENTS

| | | | |
|---|---|---|---|
| EP | 1703479 | A1 * | 9/2006 |
| GB | 2257552 | A * | 1/1993 |

(Continued)

OTHER PUBLICATIONS

Search Report for EP 11157388.7 dated Aug. 4, 2011.

*Primary Examiner* — Peter Poltorak
*Assistant Examiner* — Walter Malinowski
(74) *Attorney, Agent, or Firm* — Nixon & Vanderhye P.C.

(57) ABSTRACT

The method includes the steps of: a) generating by an application software (SWA) a message forming a key (DKE) comprising an encrypted data field containing a time-stamping or sequencing time marker; b) transferring the message to a portable communication device (CD), held by a user; c) transmitting the message, by short-range transmission, from the communication device to a reading interface (ERED) coupled to a lock device (LOCK); d) analyzing the message by decrypting the data field and checking the consistency of the time marker with an inner clock of the interface or with a sequence number memorized in the interface; and e) in case of compliant message, sending from the interface to the lock device a digital accreditation (OPEN) stored in memory in the interface and to operate the lock device unlocking upon recognizing the compliance of said digital accreditation.

10 Claims, 1 Drawing Sheet

(56) References Cited

U.S. PATENT DOCUMENTS

| | | | | |
|---|---|---|---|---|
| 7,576,633 | B2 * | 8/2009 | McGunn et al. | 340/5.73 |
| 8,482,378 | B2 * | 7/2013 | Sadighi et al. | 340/5.2 |
| 2002/0070879 | A1 * | 6/2002 | Gazit et al. | 340/901 |
| 2002/0110242 | A1 | 8/2002 | Bruwer | |
| 2003/0054804 | A1 * | 3/2003 | Brandes et al. | 455/414 |
| 2003/0122651 | A1 * | 7/2003 | Doi et al. | 340/5.7 |
| 2004/0219903 | A1 * | 11/2004 | Despain et al. | 455/410 |
| 2007/0176739 | A1 * | 8/2007 | Raheman | 713/176 |
| 2007/0257774 | A1 * | 11/2007 | Stumpert et al. | 340/7.1 |
| 2007/0271596 | A1 * | 11/2007 | Boubion et al. | 726/3 |
| 2008/0057947 | A1 * | 3/2008 | Marolia et al. | 455/425 |
| 2008/0211620 | A1 * | 9/2008 | Willgert | 340/5.2 |
| 2009/0282461 | A1 * | 11/2009 | Haustein et al. | 726/2 |
| 2009/0305673 | A1 * | 12/2009 | Mardikar | 455/411 |
| 2010/0002721 | A1 * | 1/2010 | Eller et al. | 370/466 |
| 2010/0141381 | A1 | 6/2010 | Bliding et al. | |
| 2010/0176919 | A1 * | 7/2010 | Myers et al. | 340/5.2 |
| 2010/0313024 | A1 * | 12/2010 | Weniger et al. | 713/170 |
| 2012/0172018 | A1 * | 7/2012 | Metivier | 455/414.1 |
| 2012/0204206 | A1 * | 8/2012 | Prieto et al. | 725/31 |

FOREIGN PATENT DOCUMENTS

| | | | | |
|---|---|---|---|---|
| GB | 2364202 | A | * | 1/2002 |
| GB | 2402840 | A | * | 12/2004 |
| WO | WO 96/37065 | | | 11/1996 |
| WO | WO 0035178 | A2 | * | 6/2000 |
| WO | WO 0163425 | A1 | * | 8/2001 |
| WO | WO 0231778 | A1 | * | 4/2002 |
| WO | WO 02095689 | A1 | * | 11/2002 |
| WO | WO 02097224 | A1 | * | 12/2002 |
| WO | WO 2005080720 | A1 | * | 9/2005 |
| WO | WO 2006136662 | A1 | * | 12/2006 |

* cited by examiner

SECURE METHOD FOR CONTROLLING THE OPENING OF LOCK DEVICES BY MEANS OF A COMMUNICATING OBJECT SUCH AS A MOBILE PHONE

This application claims priority to EP Patent Application No. 11157388.7 filed 8 Mar. 2011 , the entire contents of which is hereby incorporated by reference.

The invention relates to the lock devices electrically controlled by means of a dematerialized and encrypted key, wherein such key can be conveyed by a portable object held by a user, such as a portable phone, a contactless badge or card, etc.

As used herein, "lock device" means not only a lock strictly speaking, i.e. a mechanism applied for example on a door so as to prevent the opening thereof, but also any device making it possible to obtain a comparable result, for example a lock barrel considered solely, or a more specific locking device comprising various members not grouped together in a same lock case, the final purpose being to prevent, through mechanical means, the physical access to a given place or space, and to allow access to that place or space by unlocking the lock device, upon a request from the user, after having checked that this user has actually the access rights (i) that are peculiar to him and (ii) that are peculiar to the lock device. The lock device may also comprise, or be associated with, an alarm system that must be deactivated to allow access to a given space, or conversely, activated to protect this space before or after having leaving it. For the simplicity of description, it will be hereinafter simply referred to a "lock", but this term has to be understood in its wider sense, without any limitation to a particular type of equipment.

The portable object, when brought in the vicinity of the lock, acts as a key for opening the latter. Many systems are known for coupling the portable object to the lock in a galvanic way (contact smart card) or a non-galvanic way (inductive-coupling-based portable object or RFID card). Such coupling provides between the lock and the badge a communication making it possible in particular for the lock to read the accreditation data from the memory of the badge so as to operate the opening if the data is recognized as being compliant. It is also possible to use instead of a dedicated badge a mobile phone equipped with an NFC (Near Field Communication) chip and an NFC antenna, with the UICC (Universal Integrated Circuit Card, corresponding to the "SIM card" for the GSM phone functions) of the phone being used as a security element. Placing the phone in communication with a management site makes it possible to easily make in-line checks, to modify the security elements or to download new ones, etc. The WO 2011/010052 (Openways SAS) proposes a technique that can be used with any conventional mobile phone, not necessarily provided with NFC circuits, and without the obligation to use an additional dedicated portable object such as a badge or a card. Such technique is based on the use of encrypted acoustic accreditations CAC (Crypto Acoustic Credential), in the form of single-use audio signals, consisted for example of a succession of double DTMF tones. Such acoustic accreditations may be generated by a secured remote site and transmitted to the phone by usual phone transmission channels (voice or data), via the mobile phone operator MNO (Mobile Network Operator) and a trusted service provider TSM (Trusted Service Manager).

To use the accreditation, the user brings his phone close to the lock and triggers the emission, by the loudspeaker of his phone, of the series of tones corresponding to the encrypted acoustic accreditation, so that these tones can be picked up by a microphone that is integrated in or coupled to the lock. The latter decodes the accreditation, checks it and, in case of compliance, unlocks the mechanical members.

The European Application EP 09 170 475.9 of Sep. 16, 2009, in the name of Openways SAS for a "Secure system for programming electronically controlled lock devices using encoded acoustic verifications" describes more precisely the technique used. The latter consists in using the original digital data accreditations DDC (Digital Data Credential), which are peculiar to the lock manufacturer, keeping their content and their own format, and converting them into acoustic accreditations CAC. By way of illustration, the cryptographic engine of the secured site creates an acoustic "envelope" into which is "slipped" the pre-existing digital accreditation DDC, and this independently of the content of the latter because the cryptographic engine does not need to know the definition of the fields, the coding, etc., of the DDC accreditation.

The acoustic accreditation so generated is transmitted to the portable phone to be reproduced by the latter in front of the lock.

The acoustic signal picked up by the lock is subjected to a reversed conversion, making it possible to reproduce the original digital data accreditation DDC based on the picked up and analyzed acoustic accreditation CAC. In other words, the acoustic module of the lock "opens the envelope" (the acoustic accreditation CAC) to extract therefrom, in an intact state, the digital information DDC previously placed in this envelope by the cryptographic engine of the remote site, the whole without acting on the content of this digital accreditation DDC.

This technique is particularly efficient and sure. In particular, the fact that this is the same third-party source (the lock manufacturer/manager) that generates all the digital accreditations DDC ensures a secured identification of the approved users, whatever the accreditation delivery method: either by the phone, in the form of an acoustic accreditation CAC, or otherwise by reading a specific card or badge, for example. However, it has several drawbacks.

Firstly, the generation of the acoustic accreditation requires that the third-party source (which holds and delivers the digital accreditation DDC) is interfaced with the cryptographic engine of the remote site (which generates the acoustic accreditations CAC). This interface is always rather difficult to implement, and is specific to each third-party source, hence overcosts for the implementation of the system.

Secondly, the digital accreditation DDC is a message of rather significant size, because it has to convey a lot of information, in particular when it has to be used with autonomous locks. The message of the accreditation DDC has indeed to provide management of various functions such as revoking old authorizations, updating the list of approved users memorized in the lock, etc. The digital accreditation DDC may also comprise specific data, for example data required for checking the correct reading of a dedicated card or badge, but that will be of no use if the accreditation is delivered via a portable phone through an acoustic accreditation CAC. That way, the transmission of the accreditation from the phone to the lock device may take a relatively long time with respect to the reading of a simple dedicated badge, and this uselessly.

The object of the invention is to propose a technique making it possible, with the same level of security as just described, to avoid the use of a digital accreditation generated by a third-party source, with the following correlative advantages:

- no need for an interface with the server of a third-party source;
- use of the same technique with all the lock devices, whatever the manufacturer is;

use of rather compact messages, which can thus be transmitted in a very short time;

possibility to nevertheless define criteria of use such as: restricted access hours, expiry date, access to one or several doors for a given user, etc.;

with autonomous locks, possibility to revoke previous authorizations given to other users with dedicated badges, even if the approval has not expired.

Another object of the invention is, in the case of autonomous locks, to perform a resynchronization of the inner clock of this lock.

Indeed, insofar as a great part of the security of the system is based on the management of the obsolescence of the authorizations in time, it is important to correct the problems related to the drift of the locks' inner clocks that may have, in particular in certain conditions of temperature, a non-negligible impact liable to prevent the correct operation of the system.

It is therefore important that this drift can be taken into account and that the lock inner clock can be readjusted to a reference clock with which it has to be synchronized.

Another object of the invention is to make it possible to use non-secured coupling technologies—which are thus simple to implement—between the phone and the lock, and to therefore avoid the complexity of the secured coupling systems generally used in the access control applications.

A typical example of non-secured coupling is the NFC "peer-to-peer" mode that, unlike the "card emulation" mode, does not use the phone security elements (SIM card or other security element) and thus does not depend on the mobile network operator MNO that has emitted the security element and is liable to control the use thereof.

Indeed, as will be seen hereinafter, the invention does not aim to prevent the interception or the duplication of the signals exchanged between the lock and the phone (or the badge, the card . . . ), but only to make inoperative an accreditation that would have been duplicated or reconstructed (for example, by reverse engineering) or fraudulently applied to the lock.

The basic idea of the invention is to do so that the digital accreditation of the third-party source, which permits the lock unlocking, is no longer in the "envelope", but in a reading interface module coupled to the lock, for example in the firmware of this module.

For that reason, it will be no longer required to interface the portable object (portable phone or other) with the third-party source, and no longer needed to place a content in the envelope. The latter will be able to be empty, i.e. it will contain no third-party key such as a digital accreditation of the DDC type as in the prior art system.

Therefore, the size of the information to be transmitted will be able to be significantly reduced. In particular applications, the size of the envelope will be able to be adapted so as to convey specific information (authorized hours, expiry date, etc.), but in any case, the size will be able to be reduced and optimized as a function of the real needs in complexity of the system, so as to reduce the transmission to the envelope alone, without DDC content.

The reading interface module will check only the validity of the envelope and will transmit to the lock the accreditation kept in memory (in the module) permitting to operate the lock unlocking.

The control of compliance of the invention is based on time stamping or an equivalent technique (sequential counter), implemented based on data contained in a field of the envelope, whose value will be compared to a respective inner clock of the horizontal RTC (Real Time Clock) type, or to an inner counter of the interface module.

In the case of autonomous lock devices, the "opening" of the envelope by the interface module will advantageously control the retiming of the module inner clock, so as to avoid the excessive drifts of this inner clock. Still in the case of autonomous devices, the opening of the envelope will also control the revocation of any previous opening authorization given to a user. For example, in the case of a Hotel Application, the opening of the door by a new client holding a portable object (portable phone or other) will automatically revoke any authorization given to a previous guest, even if this authorization has not expired, and this without having to reprogram the lock.

In any case, and unlike the conventional systems with badges or keys, the matter is not to prevent the duplication of an envelope, but only to make inoperative a duplicated envelope. It will therefore be possible to use simple and sure not-secured coupling technologies between the portable object (telephone or badge) and the reading interface of the lock. More precisely, the invention proposes a method characterized by the following steps:

a) generating by an application software a message forming a key, said message comprising an encrypted data field containing a time marker, wherein said time marker is a marker of time stamping by a reference clock coupled to the application software, or a sequencing marker incremented by the application software;

b) transferring the message to a portable communication device, held by a user;

c) transmitting the message, by a short-range transmission technique, from the communication device to a reading interface coupled to a lock device;

d) analyzing the message within the reading interface by decrypting the data field, and checking the consistency of the time marker contained in the data field with an inner clock of the reading interface, in the case of a time stamping marker, or with a sequence number memorized in the reading interface, in the case of a sequencing marker; and e) in the case of a message established as compliant following the checks of step d), sending from the reading interface to the lock device a digital accreditation, stored in memory in the reading interface, adapted to operate the lock device unlocking upon recognizing the compliance of said digital accreditation.

Very advantageously, the message generated in step a) further comprises a field containing an encryption method identifier, and the data field is encrypted by said encryption method, and step d) further comprises reading the encryption method identifier in the non-encrypted field, and the decryption of the data field is operated by applying the encryption method read.

The field containing the encryption method identifier is preferably a non-encrypted field or a field encrypted according to a predetermined encryption process. In step a), the application software selects the encryption method identified in the message among a plurality of possible encryption methods, said selection being operated in a pseudo-random manner according to a predetermined secret algorithm; and in step d), after reading of the encryption method identifier in the non-encrypted field, the reading interface selects, by implementing a predetermined secret algorithm of correspondence, the method to be used for decrypting the data field among a plurality of methods stored in memory.

According to various advantageous subsidiary characteristics:

when the time marker is a marker of time stamping by a clock coupled to the application software, it is further provided a step consisting in retiming the inner clock of the reading interface based on the time marker read in the data field;

when the time marker is a sequencing marker, it is further provided, in the case of a message established as compliant following the checks of step d), a step consisting in updating the sequence number memorized in the reading interface based on the time marker read in the data field;

it is further provided, in the case of a message established as compliant following the checks of step d), a step consisting in invalidating, if present, a previous approval relative to a prior user, stored in the reading interface;

step a) is performed within a remote server integrating the application software;

the communication device is a portable phone, and step a) is performed within the communication device by an inner midlet integrating the application software;

the encrypted data field further contains specific access authorization conditions, and step d) further comprises a sub-step of checking the compliance of the specific access authorization conditions read in the data field;

step c) of transmitting the message from the communication device to the reading interface is a galvanic contactless transmission by a means of the group formed by: transmission of acoustic signals; NFC inductive transmission, in particular in peer-to-peer mode; radiofrequency transmission, in particular Bluetooth; transmission of light signals, notably IR; transmission of vibrations by mechanical contact.

An exemplary embodiment of the device of the invention will now be described, with reference to the appended drawings in which same reference numbers designate identical or functionally similar elements through the figures.

Figure 1:
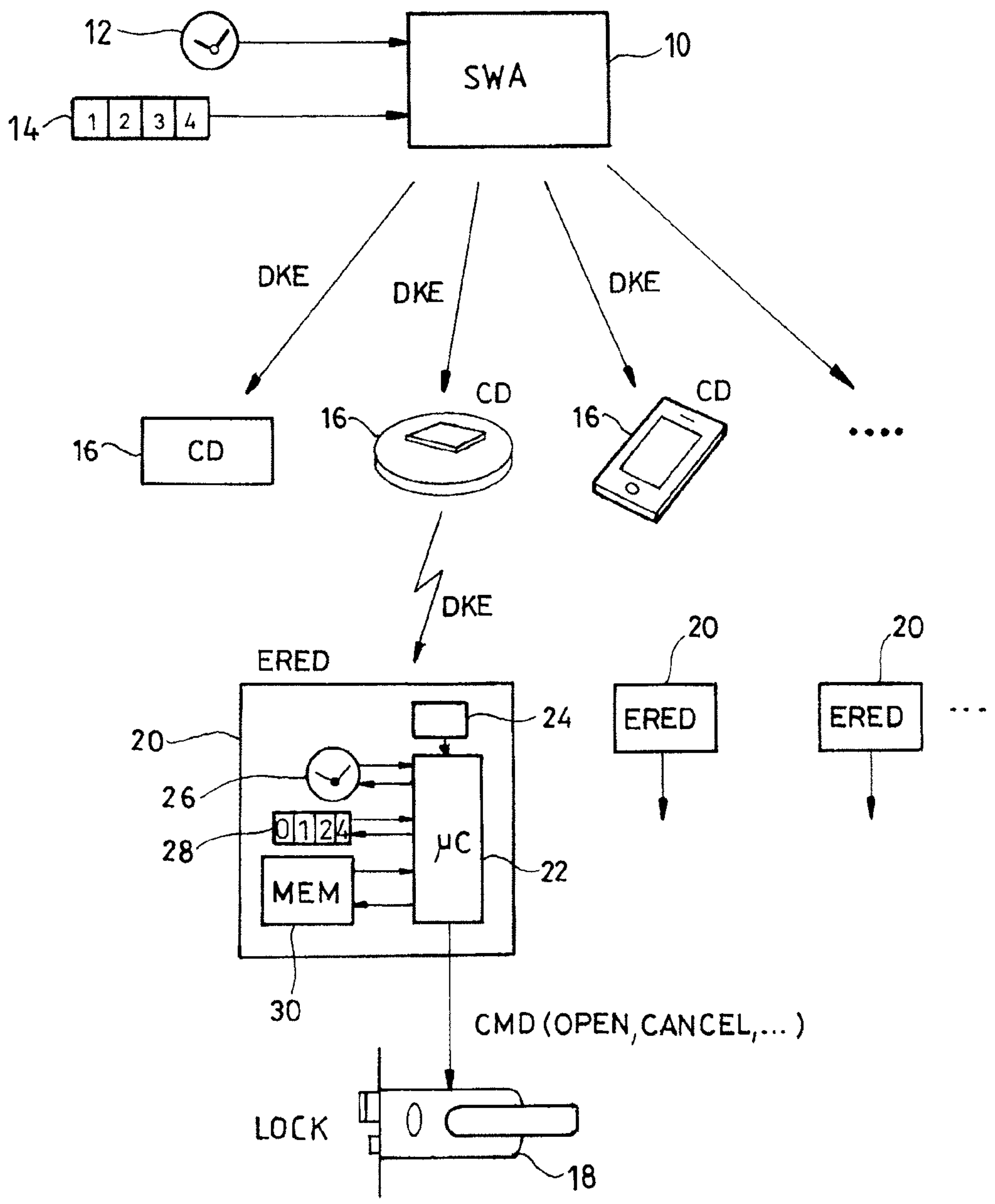
FIG. 1 is a schematic representation of the various elements involved in the implementation of the invention.

The invention is based on the use of messages hereinafter denoted DKE (Digital Key Envelope). Such DKE messages are generated by an application software SWA (SoftWare Application), symbolized by the block 10 in FIG. 1, on the basis notably of a reference clock 12 and/or a sequence counter 14.

The DKE messages are transmitted, by different modes that will be explained hereinafter, to communication devices CD (Communication Device), designed by 16, which may be consisted by a portable telephone, a dedicated remote control, a computer system, etc.

As a variant, the application software SWA may be integrated to the communication device CD 16, or to another computer device, since it permits to implement the time reference formed by the clock 12 and/or the sequence counter 14 for surely identifying the communication device 16 receiving and using the DKE message.

The DKE message is consisted of a data flow intended to permit the opening of the lock device 18. This message is transmitted by the communication device CD 16 to an interface module 20, referred to as ERED (Envelope Reading Electronic Device), which is a part of the lock device 18.

The coupling between the communication device 16 and the lock device 20 may be operated by various techniques well known in themselves such as acoustic transmission, inductive coupling of the NFC type (in particular peer-to-peer), Bluetooth coupling, another radiofrequency coupling, infrared coupling, light coupling, vibration coupling, etc., wherein the coupling does not need at all to be secured, as mentioned hereinabove.

Characteristically, the DKE message conveys no digital accreditation of the DDC type emitted by a third-party source (lock manufacturer) and this is the DKE message that becomes itself an accreditation, even in the absence of a digital accreditation conveyed by the message.

The interface 20 checks the integrity and validity of the DKE message it receives and sends a command CMD to the lock, in particular a command of unlocking (OPEN), but also a command of revoking an authorization given to a prior user (CANCEL), or any other command useful for the management of the lock device.

The interface 20 is a software that is implemented by a microcontroller 22 and a receiving circuit 24 adapted to receive the DKE message that is transmitted to it by one of the above-mentioned coupling modes. The microcontroller 22 is also linked to an inner real time clock RTC 26 (independent or included in the microcontroller 22), peculiar to the interface 20 and/or to a sequence counter 28, so that it can have a time mark that will be compared to the time reference of the application software SWA 10 (clock 12 and/or sequence counter 14), after the latter has been transmitted via the DKE message and received by the microcontroller 22. The interface 20 also comprises a memory 30 permitting in particular to manage the various operations of decryption of the received DKE message.

The lock device 20 may also be provided so as to be used in combination with dedicated keys or badges acting as a physical accreditation, that is to say that the detection of such a badge will be considered as an approval given to the holder of this badge.

The transmission of the DKE message from the application software 10 to the communication device CD 16 may be performed in different ways.

A first transmission mode is an “in line” real time mode, with an immediate and direct transmission at the time of use, i.e. at the time when the opening of the door is requested.

As a variant, the transmission may also be executed by a method of the “call back” type, where the user enters in telephonic contact with a management site that does not answer immediately, but that, after hanging up, makes the mobile phone ring so that the user can once again establish the contact with the site, and this is at that moment that the DKE message is delivered to him.

This “in-line” mode is particularly simple to implement, insofar as it just requires the use of an existing mobile phone network infrastructure (voice or data), for example, without a previous adaptation of the phone and without previously doing something on the latter.

Another advantage lies in the possibility to check in real time that the phone actually belongs to an authorized user, with the possibility to immediately take into account a “black list” of users.

Moreover, thanks to this in-line mode, it is possible to have access, at a remote site, to a lot of information about the use of the message, in particular the date and the time of use thereof, and possibly the geographical location of the user by identifying the network cell from which the user calls.

In particular, insofar as a bidirectional communication exists between the lock and the remote server (via the interface module ERED 20 and the communication device CD 16 coupled in peer-to-peer mode), it becomes possible to send back to the server information confirming the correct use of the DKE message and the actual opening of the lock, the whole with an indication of the date and the time of use, the identity of the lock, that of the communication device CD used, etc.

Another function available with the in-line mode is the possibility to program or reprogram the lock. For that purpose, when the communication device CD 16 is coupled to the remote server via the interface module ERED 20, the system reads the UID (Unique IDentifier) memorized in the lock (such identifier being uniquely assigned and making it possible to univocally identify the lock) and transmits it to the sever, possibly after an explicit short name ("cellar", "garage", "service door", etc.) given by the user by means of the communication device has been added to it. After the usual checks, the server will send back, in the data field of the DKE message, the data for (re)programing the lock.

The reading and sending of the unique identifier UID of the lock to the server may also serve as a simplified implementation of the opening control. Indeed, insofar as the server has a lock identifier, which it can check and compare with the corresponding information contained in its database, it is possible for this server to localize the user in real time when the latter requests the opening of the lock by sending a request to the server. Once the usual checks performed, the server can send back a DKE message allowing the opening of this particular lock, but containing only the information strictly indispensable for this opening. The size of the message, and the time required for its transmission, may therefore be significantly reduced.

The in-line mode thus offers a significant number of potentialities, thanks to the possibility to establish a direct bidirectional link between the lock and the server.

On the other hand, this mode requires having access to the mobile network, which is not always possible (underground parking lots, non-covered areas, etc.).

Another transmission mode, referred to as "off-line" mode, can be used, in particular if no access to the network is ensured at the moment of use.

In this case, the communication device CD connects in advance to the management site and receives from the latter a predetermined number of DKE messages generated by the application software SWA at the remote site. These DKE messages are securely stored in the phone. At the moment of use, the user initiates an application integrated to his phone, which finds the first DKE message among those that have been stored, transmits it to the lock interface, and cancels it from the memory, and so on for the following messages.

Each of the generated and stored DKE messages is uniquely individualized by a time marker in the form of a different sequence number, in order to make inoperative a DKE that would have been duplicated or reconstructed (the aspect will be developed in detail hereinafter). Advantageously, the DKE message also comprises an auxiliary sequence number that is the same for all the DKEs sent to a same communication device CD during a same DKE download and storage session. If the lock detects an incrementation of this auxiliary number, it interprets this modification as a change of user, and can then command the revocation of any approval given to a previous user and stored in the memory of the reading interface 20 (purge of the prior approvals).

The application permitting this implementation is a midlet stored in the phone, previously sent to the latter by the mobile network operator, or downloaded or received via an Internet connection. When the stock of DKE messages stored in the phone will be exhausted, or on the way of exhaustion, and the user will be again capable of acceding to the network, this stock of messages will be replenished to permit latter uses.

Figure 2:
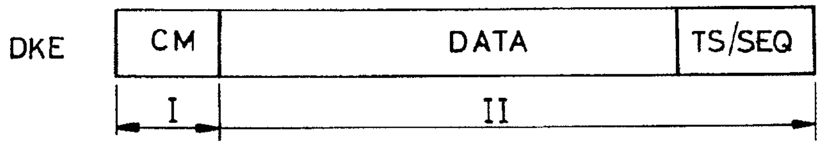
FIG. 2 illustrates the structure of the data block used by the method of the invention.

FIG. 2 illustrates the basic structure of a DKE message.

The latter comprises two areas, an area I, which is not encrypted or which is encrypted with a method known in advance, and an encrypted area II containing data and a time marker such as a time stamp TS or a sequence number SEQ.

The area I contains an encryption method indicator CM, which refers to a method chosen among several different possible methods, the area II having been encrypted by the application software SWA 10 by means of the selected method indicated in the field CM of the area I. Advantageously, the encryption method used for encrypting the area II is modified at each generation of a new DKE message by the application software SWA 10, and the selection of the encryption method CM is operated by a pseudo-random generation algorithm, so as to make unpredictable the determination of the encryption method that will be chosen. The encryption methods may be known methods, such as AES, DES, etc., as well as "proprietary" encryption methods, peculiar to the designer of the system.

When it receives the DKE message, the interface 20 reads in the field I the indicator CM of the encryption method used, selects among several algorithms the one that corresponds to the method CM read in the DKE message, and decrypts the area II by this method, so as to deliver in clear the fields of data DATA and of time marker TS/SEQ.

The length of the DKE message may be fixed (static message) or variable (dynamic message).

In the case of a static message, corresponding to the simplest configuration, the data field DATA may comprise the following information:

- identification of the site where the lock(s) the user is authorized to open is(are) located;
- identification of the door(s) of the site the user is authorized to open;
- header indicating that it is a static message and given the length thereof;
- in case of time stamping, the maximal authorized difference between the time stamp given by the interface at the moment of the opening and the time stamp contained in the message;
- limited number of authorized openings of a same door;
- limited number of door openings on the site, etc.

In the case of a dynamic message, it is possible to lengthen the data field (the length being indicated in the header) to take into account information such as:

- access to door n° 1, n° 2, . . . , n° n;
- access to the doors whose number is comprised in the range x to y;
- date of expiry of the authorization, etc.

The validity of the DKE message is checked by comparing the information contained in the field TS/SEQ of the received message (information reflecting the state of the reference clock 12 and/or of the counter 14 associated with the application software 10 having generated the message) with the value of the real time clock 26 and/or the sequence counter 28 of the interface 20.

A comparison between the clocks 12 and 26 is conceivable only in the case of a direct transmission, in line, of the DKE message from the application software SWA 10 to the interface 20. The consistency between the values of the two clocks is assessed to within an uncertainty, which is required because of the possible drift of the real time clock 26 of the interface 20 that belongs to an autonomous device, wherein this tolerance can be predetermined, or specified in a field of the DKE message. Besides, if the DKE message is compliant, the clock 26 is retimed to the reference clock 12, i.e. to the time stamp data TS contained in the DKE message.

On the other hand, the control of consistency between the sequence counters 14 and 28 applies in all the cases, and notably when the DKE message is not transmitted in real time. The sequencing follows a predetermined algorithm (linear or not), known only by the application software 10 and the interface 20. In case of consistency between the sequence counters 14 and 28, the counter 28 is updated, by giving it the value of the counter 14 read in the DKE message.

In case of compliance of the time stamp and/or of the sequence counter, the interface 20 sends to the lock 18 itself a digital accreditation CMD for opening the latter (command OPEN). Advantageously, the command of valid opening is followed by an invalid command (CANCEL) of any authorization previously given to a different user, which would still be present in the lock device.

The invention claimed is:

1. A secured method for controlling the opening of lock devices, characterized by the following steps:

a) generating by an application software (SWA) a message forming a key (DKE), said message comprising an encrypted data field containing a time marker, wherein said time marker is a marker of time stamping by a reference clock coupled to the application software, or a sequencing marker incremented by the application software;

b) transferring the message to a portable communication device (CD), held by a user;

c) transmitting the message, by a short-range transmission technique, from the communication device to a reading interface (ERED) coupled to a lock device (LOCK);

d) analyzing the message within the reading interface by: decrypting the data field, and checking the consistency of the time marker contained in the decrypted data field with an inner clock of the reading interface, in the case of a time stamping marker, or with a sequence number memorized in the reading interface, in the case of a sequencing marker; and e) in the case of a message established as compliant following the checks of step d), controlling the unlocking of the lock device, wherein;

said reading interface, coupled to said lock device, stores in a memory a digital accreditation (OPEN) adapted to control said unlocking of the lock device, said digital accreditation is not included in said decrypted data field of said message forming a key (DKE); and in step e), if said checks of step d) are established as compliant, said digital accreditation is sent from the reading interface to the lock device, whereby controlling in response the unlocking, of the lock device, wherein it is further provided, in the case of a message established as compliant following the checks of step d), a step consisting in:

f) invalidating, if present, a previous approval relative to a prior user, stored in the reading interface.

2. The method of claim 1 wherein:

the message generated in step a) further comprises an additional field containing an identifier (CM) for an encryption method, and the encrypted data field is encrypted by said encryption method, and step d) further comprises reading said identifier in the non-encrypted field, and the decryption of the encrypted data field is operated by applying the encryption method identified by the identifier read.

3. The method of claim 2 wherein the additional field containing the encryption method identifier is a non-encrypted field or a field encrypted according to a predetermined encryption process.

4. The method of claim 2 wherein:

in step a), the application software selects the encryption method identified in the message among a plurality of possible encryption methods, said selection being operated in a pseudo-random manner according to a predetermined secret algorithm; and in step d), after reading of the encryption method identifier in the non-encrypted field, the reading interface selects, by implementing a predetermined secret algorithm of correspondence, the method to be used for decrypting the encrypted data field among a plurality of methods stored in memory.

5. The method of claim 1 wherein, when the time marker is a marker of time stamping by a clock coupled to the application software, it is further provided a step consisting in:

f) retiming the inner clock of the reading interface based on the time marker read in the decrypted data field.

6. The method of claim 1 wherein, when the time marker is a sequencing marker, it is further provided, in the case of a message established as compliant following the checks of step d), a step consisting in:

f) updating the sequence number memorized in the reading interface based on the time marker read in the decrypted data field.

7. The method of claim 1 wherein step a) is performed within a remote server integrating the application software.

8. The method of claim 1 wherein the communication device is a portable phone, and step a) is performed within the communication device by an inner midlet integrating the application software.

9. The method of claim 1 wherein:

the encrypted data field further contains specific access authorization conditions, and step d) further comprises a sub-step of checking the compliance of the specific access authorization conditions read in the decrypted data field.

10. The method of claim 1 wherein step c) of transmitting the message from the communication device to the reading interface is a galvanic contactless transmission by a means of the group formed by:

transmission of acoustic signals;

NFC inductive transmission;

NFC inductive transmission in peer-to-peer mode;

radio frequency transmission;

Bluetooth transmission;

transmission of light signals;

IR light transmission; and transmission of vibrations by mechanical contact.

* * * * *